United States Patent [19]
Wagstaff

[11] 3,873,038
[45] Mar. 25, 1975

[54] DIRECTION VANES FOR THE CUTTING BLADES OF A FORAGE HARVESTER

[75] Inventor: Robert A. Wagstaff, New Holland, Pa.

[73] Assignee: Sperry Rand Corporation, New Holland, Pa.

[22] Filed: Sept. 13, 1973

[21] Appl. No.: 396,953

[52] U.S. Cl. .............................. 241/282.2, 241/221
[51] Int. Cl. ........................................ B02c 18/20
[58] Field of Search ...... 241/221, 222, 282.1, 282.2

[56] References Cited
UNITED STATES PATENTS
3,452,796   7/1969   Hennen.............................. 241/30
3,729,143   4/1973   Wagstaff et al................. 241/282.2

Primary Examiner—Granville Y. Custer, Jr.
Assistant Examiner—Craig R. Feinberg
Attorney, Agent, or Firm—Frank A. Seemar; John R. Flanagan; Joseph A. Brown

[57] ABSTRACT

A forage harvester having a cutting reel rotatably mounted in a cutting chamber for cutting incoming crop material into segmented lengths. The cutting reel contains a plurality of cutting blades each with a cutting edge to engage and cut the crop material as it is fed into the cutting chamber. The cutting edges of the cutting blades contain direction vanes rigidly mounted below and to the rear of the cutting edges to direct and maintain the cut crop in its cut path within the cutting chamber while also providing additional support to the cutting blades of the cutting reel.

13 Claims, 6 Drawing Figures

PATENTED MAR 25 1975    3,873,038

DIRECTION VANES FOR THE CUTTING BLADES OF A FORAGE HARVESTER

BACKGROUND OF THE INVENTION

The invention relates generally to harvesting machines and more particularly to direction vanes for cutting blades of forage harvesters.

Forage harvesters of the type utilizing traversely extending cutting blades rotating at high speeds on a cutting wheel to chop or sever the harvested crops into designated lengths have been known and used for many years. These cutting blades are generally mounted on a rotatable cutting reel so that the material can be more easily and uniformly cut during the forage harvesting operation. A typical type of cutting reel and mounting thereof is shown in U.S. Pat. No. 3,729,143 issued to R. A. Wagstaff, et al., on Apr. 24, 1973. This patent sets forth a typical cutting reel configuration having a rotatable shaft, a supporting means having one end rigidly mounted to the rotatable shaft and cutting blades mounted around the periphery of the supporting means. The cutting blades each contain a cutting edge which initially contacts the material in the vicinity of the shear bar, and forces the material downwardly in the direction of rotation of the cutterhead. Often during this operation the cut crop material will be swept to the underside of the cutting blade near the cutting edge. This material when it is so positioned is forced along the bottom of the cutting edge and creates an accummulation of cut crop material in a particular location on the cutting reel thereby causing localized wear on various components and members associated with the cutterhead. This localized wear causes the farmer to constantly either regrind or replace the worn components, e.g., cutting blades, supporting means, and recutter screens, thereby increasing the cost of maintenance and replacement necessary for the maintenance of this type of forage harvester.

OBJECTS AND SUMMARY OF THE INVENTION

Applicant had devised a means for maintaining the cut material which may position itself beneath the cutting blades of a cutting reel, in a particular desired direction thereby preventing the material from moving across the cutting blade during the rotational movement of the cutting reel.

It is the principle object of this invention to provide a means to prevent the cut material from moving below the cutting blade of the cutterhead and prevent the material from lodging in a particular area thereby creating problems of localized wear in the harvesting machine.

Another object of the present invention is to provide a means for directing material as it is being cut by the cutting edge of a cutting blade in a particular desired path within the forage harvesting machine.

A further object of the present invention is to provide a means for directing material which would also give added support to the cutting blade of the cutting reel.

Another object of the present invention is to provide a means for directing material as it is being cut by the cutting edge of a cutting blade which would not effect the regrinding operation periodically performed on the cutting blades.

Another object of the present invention is to provide a means for directing and maintaining material as it is being cut by the cutting blades, in a particular desired path without appreciably increasing the cost of the overall construction of the machine.

Other objects and advantages of the present invention will be apparent and obvious from a study of the following description and the accompanying drawings which are merely illustrative of the present invention.

DESCRIPTION OF THE PREFERRED EMBODIMENT

Figure 1:
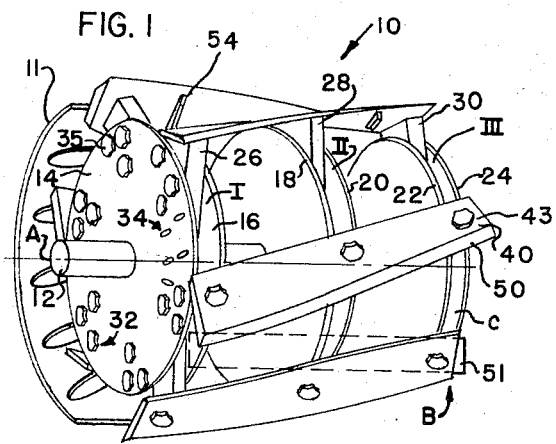
FIG. 1 is a perspective view of the cutting reel.
Figure 4:
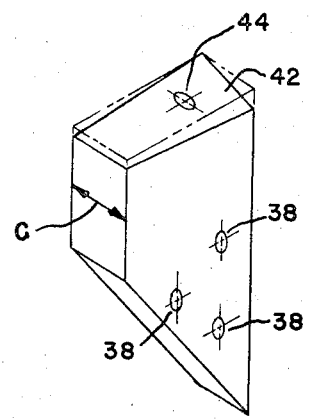
FIG. 4 is a perspective view of a mounting block.

The cutting reel 10 of a forage harvester is shown in FIG. 1. The cutting reel has a shaft 12 which is rotatably mounted for rotation about axis A, within the cutting chamber (not shown) mounted to the frame of the forage harvester. Also mounted within the cutting chamber is recutter screen 11 which is positioned to the rear and just outside the outermost periphery of the cutting reel so that crop material can be passed through said screen to be further abraded and/or cut. Six disc shaped supporting plates, 14, 16, 18, 20, 22, 24, are rigidly mounted to shaft 12 and extend radially perpendicularly to axis A of said shaft. The six plates are grouped into three pairs, I, II and III, the discs of each pair being spaced an equal distance from each other. Each pair of the disc shaped plates are spaced an axial distance apart from each other to symmetrically balance shaft 12 during its rotation. The supporting discs of each pair are spaced a small equal distance apart to receive mounting blocks 26, 28 and 30 between their respective sides. This distance is equal to the width C (FIG. 4) of the mounting blocks 26, 28 and 30. Each disc shaped supporting plate contains two rows of holes 32 and 34, the respective rows of holes in one plate of the pair being aligned with the holes contained in the other plate of the pair for passing mounting bolts 35 therethrough to fasten the mounting blocks in a particular position with respect to the supporting plates. The two rows of holes 32 and 34 are arranged with row 32 positioned around the periphery of the supporting plates while row 34 is positioned radially inwardly from row 32.

The mounting blocks 26, 28 and 30 are rectangular in cross section and have a width C corresponding to the axial distance between the plates of each supporting pair. The side portions of the mounting blocks contain a plurality of holes 38 which are capable of receiving mounting bolts 35 so that when holes 38 of the mounting blocks are aligned with the rows of holes 32, 34 of the supporting plates mounting bolts 35 can pass therethrough and rigidly fasten the mounting blocks in a particular position. The holes 38 can be aligned in various ways with the rows of holes 32, 34 so that the mounting blocks 26, 28 and 30 can be positioned at various angles in relation to the pairs of supporting plates, I, II and III.

Figure 2:
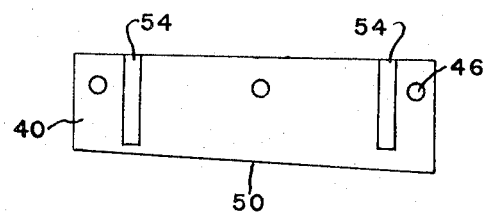
FIG. 2 is an enlarged view of an unsupported cutting blade.

Smaller forage harvesters have cutting reels with cutting blades 40 mounted directly to the end portion 42 of the mounting blocks. The end portion of the mounting blocks are provided with a bolt hole 44 capable of receiving the shaft portion of fastening bolt 43. The cutting blades 40 contain a series of transverse slots 46 adapted to permit the insertion of bolt 43 therethrough and into bolt hole 44 to fasten the cutting blades 40 directly to the respective mounting blocks as shown in FIG. 2.

Figure 3:
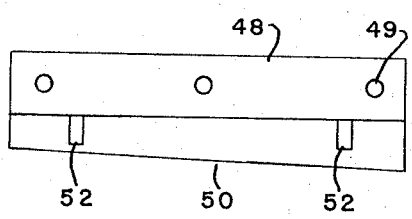
FIG. 3 is an enlarged view of a supported cutting blade.

Larger forage harvesters require the blades 40 of the cutting reel 10 be increased in size (length) thereby necessitating the use of rectangular support members 48 (FIGS. 3 and 6) to be positioned below and mounted between the cutting blade and the mounting blocks. These supports 48, contain openings 49 which can be aligned with the series of transverse slots 46 of the cutting blade, and the bolt holes 44 positioned in the end portion of the mounting blocks so that fastening bolts 43 can be inserted therethrough and rigidly secure the supports between the cutting blades and the mounting blocks. These supports give the blades 40 added rigidity between the normal mounting locations of the supporting plates 14 – 24.

The cutting blades 40 are further provided with cutting edge 50 along the front edge of each cutting blade. Material which is gathered by the forage harvester is fed by conveyor to a position within the cutting chamber and above shear bar 51. These cutting edges 50 contact the crop material when it is positioned above and over the end of shear bar 51 so as to cut the material and direct the cut material in a downward direction.

Figure 5:
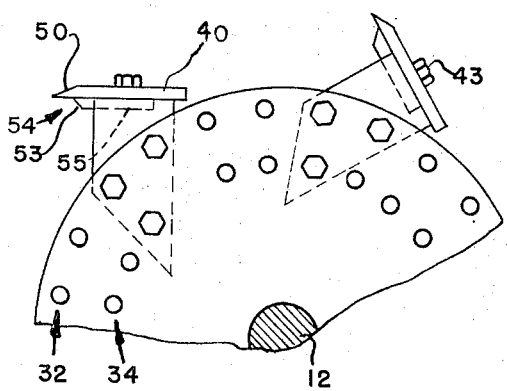
FIG. 5 is a fragmentary side view of unsupported cutting blades.
Figure 6:
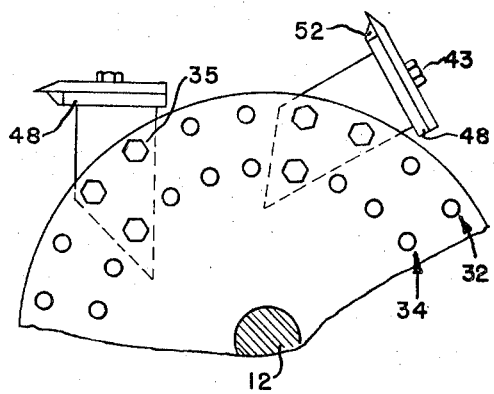
FIG. 6 is a fragmentary side view of a supported cutting blade.

Mounted below and to the rear of cutting edges 50 are direction vanes 52 and 54. The vanes 52, are used with the supported blades (FIGS. 3 and 6) and are triangularly shaped as shown in FIG. 6. The vanes are positioned at various locations along the cutting blade and extend forwardly from the support member 48 to a position behind the forward most end of the cutting edge 50. This positioning to the rear of the cutting edge is particularly important since it allows the cutting edges of the bales to be reground and sharpened without interferring with the direction vanes 52. Direction vanes 54 are used with the unsupported cutting blades (FIGS. 2 and 5) of the smaller type forage harvesters and are trapezoidally shaped having a forward most edge portion 53 which contacts and directs the material in much the same manner as vanes 52, and a rear portion 55 which gives additional support to the cutting blades during their operation.

OPERATION

During the forage harvesting operation crop material is conveyed to the cutting chamber and positioned above and over the shear bar 51. The cutting edges 50 of rotating blades 40 contact the incoming material and cut the material into various lengths, depending upon the speed at which the material is fed into the chamber. The material is cut and directed downward due to the rotational movement imparted to the crop material by the rotating blades 40. This type of cutting action causes a portion of the cut material to position itself immediately below the cutting edge 50 of the cutting blades 40. The various configurations of vanes 52 and 54, shown in FIGS. 5 and 6 respectively, positioned below the rotating blades 40, to the rear of cutting edge 50, act to direct and maintain the cut material in its cut path thereby preventing the material from moving, due to the forces exerted upon it (crop material) by the rotational movement of the cutting reel, transversely across the bottom portion of the cutting blades and accummulating towards side B of the cutting reel. Vanes 52 and 54 prevent material from moving along the bottom of the cutting edge of blades 40 thereby maintaining the cut material in essentially the same position along the blade as when it is cut. This positioning alleviates the localized wear problem encountered in previous cutter head designs as well as giving additional support and strength to the individual cutting blades.

While the preferred structure in which the principles of the present invention have been incorporated is shown and described above, it is to be understood that the invention is not to be limited to such particular details, but that, in fact, widely different means may be employed in the practice of the broader aspects of the invention.

Having thus described the invention, what is claimed is:

1. A forage harvester reel comprising:
   a. a rotatably mounted shaft;
   b. a plurality of supporting members rigidly mounted and spaced transversely across the shaft;
   c. a plurality of cutting blades each with a transversely extending cutting edge;
   d. means for mounting the cutting blades to the supporting members; and
   e. means interposed between said supporting members and positioned adjacent said cutting edges for directing and maintaining material as it is being cut by the cutting blades in its path as cut.

2. A forage harvester reel as set forth in claim 1 wherein the means for mounting said blades includes a plurality of mounting blocks each having one end adapted to be mounted to said cutting blades while the other end is adapted to be rigidly secured to said supporting members.

3. A forage harvester reel as set forth in claim 2 wherein said supporting members comprise a plurality of disc shaped plates arranged in pairs and extending normal to said shaft, said pairs of plates being spaced the width of the mounting blocks apart so that said blocks can be inserted therebetween.

4. A forage harvester as set out in claim 3 wherein each of said plates contains two rows of holes, said first row being adjacent the outer periphery of said plates while said second row is positioned radially inwardly from said first row.

5. A forage harvester reel comprising:
   a. a rotatably mounted shaft;
   b. a plurality of plates extending normal, and arranged in spaced relation axially along the shaft;
   c. plurality of cutting blades each with a transversely extending cutting edge;
   d. plurality of mounting blocks each having one end adapted to be mounted to said cutting blades at a position to the rear of the cutting edge while the other end is adapted to be rigidly secured to said plates;
   e. a first fastening member to secure the one end of the mounting blocks to said cutting blade;
   f. a second fastening member to secure the other end of said mounting blocks to said plates;

g. means interposed between said plates and positioned adjacent said cutting edge for directing and maintaining material as it is being cut by the cutting blades in its cut path; and h. means for mounting the means for directing and maintaining material to the inwardly facing surface portions.

6. A forage harvester reel as set out in claim 5 wherein the means for directing and maintaining material comprises a plurality of vanes mounted below and to the rear of said cutting edge, said vanes extending below and spaced along the cutting blade to prevent material cut by said blade from traveling traversely along said blade during rotation.

7. A forage harvester reel as set forth in claim 6 wherein said plates have a generally disc shape and are arranged in pairs axially spaced along said shaft.

8. A forage harvester reel as set out in claim 7 wherein said vanes are trapezoidally shaped so as to have their forward most end inclined away from the cutting edge to more easily engage the material.

9. A forage harvester reel comprising:

a. a rotatably mounted shaft;

b. a plurality of plates having generally circular outer peripheries and extending normal and arranged in spaced relation axially along the shaft;

c. a plurality of cutting blades each with a transversely extending cutting edge;

d. one or more supports each mounted to one or more of the inwardly facing surfaces of the cutting blades to the rear of the cutting edge;

e. a plurality of mounting blocks each having one end adapted to be mounted to and inwardly of the supports and the other end being adapted to be rigidly secured to said plates;

f. a first fastening member to secure one end of the mounting blocks to said supports;

g. a second fastening member to secure the other end of said mounting blocks to said plates; and h. a plurality of vanes mounted to said cutting blades positioned adjacent to both the forwardmost end of said supports and said cutting edge to direct and maintain material as it is being cut in its cut path.

10. A forage harvester reel as set forth in claim 9 wherein said supports comprise a rigid rectangular bar.

11. A forage harvester reel as set forth in claim 10 wherein said plurality of vanes have a generally triangular shape.

12. A forage harvester reel as set forth in claim 11 wherein said plurality of plates have a generally disc shape and are arranged in pairs axially spaced along said shaft.

13. An improved forage harvester reel of the type having a rotatably mounted shaft; a plurality of disc shaped supporting plates rigidly mounted and axially spaced along the shaft; a plurality of cutting blades each with a cutting edge; a plurality of mounting blocks each having one end adapted to be mounted to and below the cutting blades and the other end being adapted to be rigidly secured to the supporting plates; wherein the improvement comprises, means interposed between said supporting plates and adjacent said cutting edge for directing and maintaining material as it is being cut by the cutting edge in its path as cut.

* * * * *